US008862385B2

(12) United States Patent
Byrne et al.

(10) Patent No.: US 8,862,385 B2
(45) Date of Patent: Oct. 14, 2014

(54) PROVIDING AUGMENTED TRAVEL DIRECTIONS

(75) Inventors: Aiden Byrne, Redmond, WA (US);
Matthew Cheung, Redmond, WA (US);
Jeff Couckuyt, Bothell, WA (US);
Nagendra Kolluru, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1511 days.

(21) Appl. No.: 12/116,965

(22) Filed: May 8, 2008

(65) Prior Publication Data

US 2009/0281726 A1  Nov. 12, 2009

(51) Int. Cl.
| | | |
|---|---|---|
| G06F 17/00 | (2006.01) | |
| G06F 19/00 | (2011.01) | |
| G01C 21/26 | (2006.01) | |
| G01C 21/34 | (2006.01) | |
| G01C 21/36 | (2006.01) | |

(52) U.S. Cl.
CPC .......... *G01C 21/3641* (2013.01); *G01C 21/34* (2013.01)
USPC ...... 701/411; 701/424; 701/425; 340/995.14; 340/995.19

(58) Field of Classification Search
USPC ......... 701/200, 201, 206, 207, 208, 209, 210, 701/211, 212, 213, 300, 400, 408, 411, 414, 701/416, 417, 418, 420, 423, 424, 425, 426, 701/428; 340/988, 989, 990, 992, 995.1, 340/995.12, 995.14, 995.17–995.24, 340/995.27, 996
See application file for complete search history.

(56) References Cited

U.S. PATENT DOCUMENTS

| | | | |
|---|---|---|---|
| 5,919,246 A * | 7/1999 | Waizmann et al. | ........... 701/209 |
| 6,035,253 A | 3/2000 | Hayashi et al. | |
| 6,212,473 B1 * | 4/2001 | Stefan et al. | ................... 701/210 |
| 6,249,742 B1 * | 6/2001 | Friederich et al. | ............ 701/202 |
| 6,256,579 B1 | 7/2001 | Tanimoto | |
| 6,360,167 B1 * | 3/2002 | Millington et al. | ........... 701/211 |
| 6,812,888 B2 * | 11/2004 | Drury et al. | .............. 342/357.13 |
| 6,895,126 B2 | 5/2005 | Di Bernardo et al. | |
| 6,909,965 B1 | 6/2005 | Beesley et al. | |
| 6,993,429 B2 | 1/2006 | Obradovich et al. | |
| 7,092,819 B2 | 8/2006 | Odachi et al. | |

(Continued)

OTHER PUBLICATIONS

Ekpenyong, et al., "Updating of Road Network Databases: Spatio-Temporal Trajectory Grouping Using Snap-Drift Neural Network", CEUR Workshop Proceedings, Part of the proceedings of the 10th International Conference on Engineering Applications of Neural Networks, EANN 2007, Dated: 2007, 10 pages.

(Continued)

*Primary Examiner* — Thomas Tarcza
*Assistant Examiner* — Edward Pipala
(74) *Attorney, Agent, or Firm* — Steven Spellman; Jim Ross; Micky Minhas

(57) ABSTRACT

Providing machine-generated travel directions with customized augmentations to enhance the navigation process. To provide machine-generated travel directions, a user submitted starting location, destination location, and meta-data associated with the user is used to generate a route between the starting location and destination location Annotations to the route are derived based on the meta-data associated with the user or characteristics associated with the route. The annotations are then ranked according to a determined priority. The route generated between the starting location and the destination location, and augmented with the ranked annotations, is displayed to the user.

20 Claims, 9 Drawing Sheets

(56) References Cited

U.S. PATENT DOCUMENTS

| | | | |
|---|---|---|---|
| 7,206,692 | B2 | 4/2007 | Beesley et al. |
| 7,647,166 | B1 * | 1/2010 | Kerns .......................... 701/207 |
| 2006/0142939 | A1 | 6/2006 | Muramatsu |
| 2007/0073472 | A1 | 3/2007 | Odinak et al. |
| 2007/0244632 | A1 | 10/2007 | Mueller et al. |

OTHER PUBLICATIONS

Guldner, et al., "Coding of Road Information for Automated highways", Institute of Transportation Studies, California Partners for Advanced Transit and Highways (PATH). Working Papers: Paper UCB-ITS-PWP-97-7, Dated: 1997, 21 pages.

Burnett, "Turn right at the Traffic Lights" The Requirement for Landmarks in Vehicle Navigation Systems, Facet Technology Corporation—SightMap, 15 pages.

Hu, et al., "Fusion of Realities for Vehicle Navigation", International Symposium on Computer Vision, Object Trackin and Recognition, Beijing (2004), 6 pages.

* cited by examiner

PROVIDING AUGMENTED TRAVEL DIRECTIONS

BACKGROUND

Computerized systems have made a significant contribution towards the advancement of modern society and are utilized in a number of applications to achieve advantageous results. Navigation-assisted travel is one such example that has benefited from the utilization of computerized systems.

Computerized navigation systems are now available that enable a traveler to generate a customized route to a specified destination. Popular applications of computerized navigations systems include Internet web sites which use map routing software to generate and display driving instructions from one starting location to a destination location. Typically, the traveler enters the desired starting location (e.g., an address or intersection of streets) and the desired destination location into an input terminal and the map routing software determines the most efficient route between the two locations based on various criteria, typically distance. The map routing software is often further configurable to adjust for emphases (or avoidance) of certain route characteristics such as freeways, speed, traffic, etc. However, these internet web sites customarily provide only simple step-by-step directions accompanied by scant additional knowledge—typically the distance traveled on each segment of the route—that may be insufficient or confusing to travelers new to the route or area.

Another application of a computerized navigation system incorporates a position determining system, such as a navigation system with a Global Positioning Satellite ("GPS") receiver, to allow a traveler to track his location in real-time. Such navigation systems include functionality to generate travel directions based on either the position of the GPS receiver or some other specified starting location to a specified destination. These directions are subsequently adjusted or updated in real time based on the derived position of the GPS receiver. However, these navigation systems typically do not provide any additional information along the generated route.

Generally, a navigation system provides the traveler with specific segmented (i.e. step-by-step) driving instructions, such as which street and direction to turn, and how far to proceed along each segment. Presently available enhancements to computerized navigation systems are capable of conveying additional information which a driver may use to improve the navigation process. Such enhancements have included the ability to generate a graphical map of the region, report traffic congestion or accidents, define custom landmarks, and provide photographs or information about pre-set or user-defined landmarks along the route(s) determined by the navigation system between the starting and destination locations. However, a route generated by navigation systems which provide these enhancements may include so much information as to become unwieldy, confusing to the user, or inefficient to display. Furthermore, generated routes with the aforementioned enhancements may still lack the ability to provide other clearly observable indicia to make the route more easily navigable for the traveler.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One embodiment is implemented to provide annotated travel instructions. This embodiment includes receiving a user submitted starting location, destination location and meta-data associated with the user. A route is then generated between the starting location and destination location. Available annotations to the route are derived based on information associated with the generated route. The available annotations are then ranked according to a determined priority. The route generated between the starting location and the destination location, and augmented with the ranked annotations, is displayed to the user.

In another embodiment, the route is generated as a sequence of discrete maneuvers. Available annotations to the route are derived based on information obtained associated with the discrete maneuvers. The available annotations are ranked according to a priority determined as a function of the annotations available and the meta-data associated with the user. Annotations may include information regarding visible landmarks, significant changes in topography or geography, current traffic levels, confirmation of progress or regress, difficult or particular operations (e.g., U-turns, multi-lane mergers, etc.) and user-defined features associated with one or more maneuvers. According to another embodiment, the annotations are filtered according to a threshold level of priority to remove all annotations below the threshold level. The filtered compilation of annotations is then used to augment the route as displayed to the user.

Another embodiment is implemented as a computer environment for providing travel directions, wherein a direction engine, an augmentation engine and a user interface is implemented by the computer system to achieve the functionality of the present invention. The user interface receives a set of locations from the user (e.g., a starting location and a destination location) and submits the set of locations along with meta-data associated with the user to the direction engine. The direction engine generates a route as a sequence of discrete maneuvers or "steps." The generated sequence is cross-referenced with the augmentation engine that derives available annotations along the route. The annotations are ranked and filtered to remove less relevant or less observable annotations. The user interface receives and augments the route with the ranked and filtered annotations. The user interface then displays the augmented route to the user.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the claimed subject matter. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1:
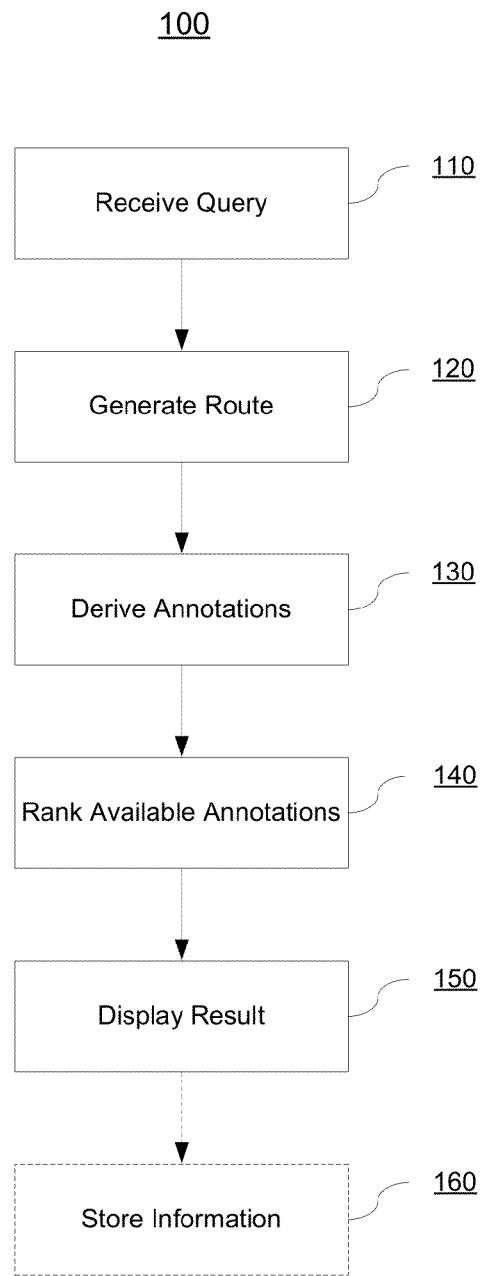
FIG. 1 is a flowchart describing a process for generating travel directions in accordance with various embodiments.

FIG. 1 is a flowchart describing a process 100 for providing machine-generated travel directions. The process 100 includes deriving augmentations to the travel directions to facilitate a user's navigation experience. Steps 110-160 describe exemplary steps comprising the process 100 in accordance with the various embodiments herein described.

According to the process 100 of FIG. 1, a query consisting of two or more locations (a starting location and one or more destination locations) along with meta-data associated with the user is received by the user at step 110. A location is typically entered as the address of the desired location (either starting or destination) but may consist of other data, such as the address with the closest proximity to the desired location, a nearby intersection of two streets, or a well-known site with a pre-stored location (such as an airport). Meta-data associated with the user may include information about the user, where the query is sent from, a history of the user's queries or whether the user lives in or frequents the area. The meta-data may be directly submitted by the user, or alternatively may comprise stored data that was previously obtained from the user.

A route between the starting location and the destination location(s) is generated at step 120. The route may be generated for optimal efficiency according to, or as a combination of, various metrics. Examples of metrics include generating a route encompassing the shortest total traveling distance, the shortest expected travel time, and the route with the least amount of discrete maneuvers, among others. Annotations to the route are derived at step 130. According to another embodiment, the generated route is parsed as a sequence of discrete maneuvers according to the metric of efficiency in step 120. Available information corresponding to each maneuver is determined and appended as a list of available annotations for each maneuver. In one embodiment, a server of constantly updated databases cataloguing the current features along traveled routes is accessed to determine the available information along the generated route.

The information comprising the annotations may include information concerning any visible indicia along the maneuver to determine the conformity of the presently traveled route with the pre-navigated route, or information which may otherwise assist the traveler. Visible indicia may include well-known business structures or other landmarks (e.g., a bridge, a well-known statue, highly recognizable office building, etc.), or distinctive geographical or topographical characteristics (e.g., named bodies of water, noticeable changes in elevation, etc.). Information which may otherwise assist the traveler includes road conditions at the time of the query (e.g., traffic conditions, construction delays), difficult operations that a traveler may need to perform in a given maneuver (e.g., a U-turn, merging across several lanes of a road or highway, notice of a particularly short or long maneuver), affirmative confirmation that the presently traveled route conforms with the pre-navigated route, or warning of possible indicia to alert the traveler that the presently traveled route does not conform with the pre-navigated route.

The available annotations are then ranked according to a determined priority at step 140. The priority may be determined based on characteristics of the generated route, the annotations available along the route, the necessity of the annotation (implemented, perhaps, as a function of the user's estimated familiarity with the area and the complexity of the route), the prominence of the annotation, and the position of the annotation with respect to the user (in embodiments utilizing real-time navigation) or relative to the generated route (in embodiments featuring pre-travel navigation).

For example, highly visible national landmarks may be given a higher priority than a less recognizable business structure. Likewise, crossing a bridge may be awarded a higher priority than crossing a set of train tracks. Yet another example may be prioritizing a extreme traffic congestion over a slight decline in the road. Conversely, a highly visible national landmark or bridge may be so obvious as to be unnecessary for a traveler with an extensive history of traveling near or around the generated route (as indicated by the user's meta data). In such cases, unnecessary annotations are omitted, unless no other annotations are available. Annotations (e.g., landmarks) positioned in the direct path of the generated route may be given greater priority than, for example, annotations poorly positioned (e.g., behind a traveler, or a great distance away from the generated route) which may confuse the traveler. In such instances, poorly positioned annotations may be omitted, unless no other annotations are available.

According to one embodiment, the ranked annotations are then filtered to remove annotations below a threshold level of priority. The threshold level of priority may be a function of the meta-data associated with the user and the characteristics of the route. For example, if the user is very familiar with the or if the user has queried the route or a similar route in the past, the threshold level of priority may be set at a very high level to remove all but the annotations with the highest priority/ranking. Likewise, if the user is querying directions for a distant or unfamiliar location, the threshold may be set low to allow more augmentations.

The resulting data of the generated route is displayed as a list of discrete maneuvers augmented with the annotations at step 150. The resulting data may be displayed, for instance, by separately displaying each discrete maneuver with its corresponding annotations.

Step 160 describes an additional step of storing the information obtained during steps 110-150 according to one embodiment. The information stored may include the locations submitted by the user, the generated route, the derived annotations or the submitted meta-data of the user. In another embodiment, the information obtained during steps 110-150 may be stored with reference to the user. Subsequent information may then be appended to previously stored information to comprise a specific user's travel history. The information may also be used to update the specific user's meta-data.

The user's travel history and meta-data may then be used a factor in determining the priority of annotations and the threshold level of priority to be filtered when the annotations are ranked at step 140 in subsequent queries by the user. In another embodiment, the user may designate portions of the route as particularly memorable features. This information may also be stored for use in subsequent navigation queries.

Figure 2:
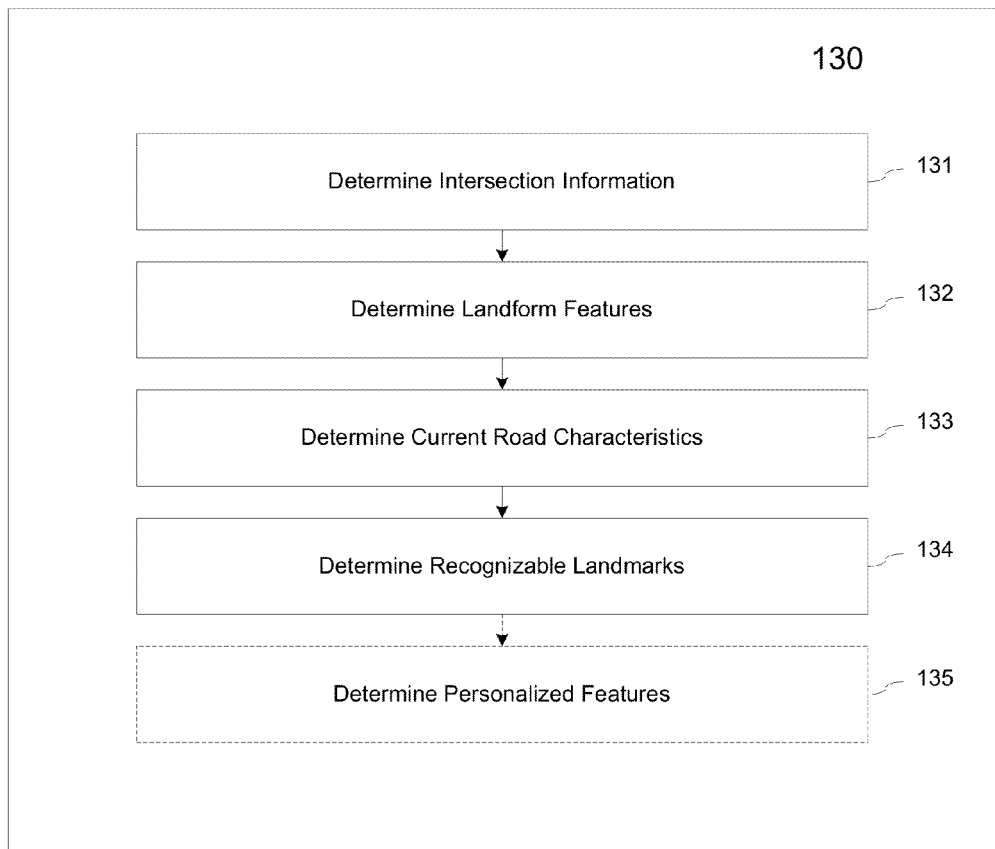
FIG. 2 is a flowchart describing a process for deriving available annotations in accordance with various embodiments.

FIG. 2 is a flowchart describing a process for deriving available annotations in accordance with varying embodiments. As depicted in FIG. 2, Steps 131-135 describe the constituent steps of deriving available annotations as provided in the step 130 of FIG. 1.

The available annotations derived by the process comprise information concerning any visible indicia along the generated route, or information which may otherwise assist the traveler. This information allows the generated route to be augmented with affirmations to the user that the currently traveled path conforms to the optimal generated route or notices that alert the user that the current path has deviated from the optimal generated route.

The process for deriving the annotations in step 130 comprises obtaining information corresponding to the route in an aggregated list distinguished by discrete portions (e.g., maneuvers) of the generated route. At step 131, information corresponding to the intersection of roads or pathways along the route is determined. Information corresponding to the intersection of roads or pathways may include the intersection of streets immediately prior to the destination or next action point (e.g., the beginning of the next maneuver, or the end of the current maneuver). This information may also include the intersection of streets immediately subsequent to the destination or next action point. At step 132, information corresponding to distinctive landform features along the route is determined. Landform features may include lakes, rivers and hills, etc. visible to the traveler along any portion of the route.

At step 133, information regarding current road characteristics is determined. Information regarding current road characteristics may include changes to the surface type, lane shifts or abrupt mergers and the like. In one embodiment, traffic along the route is also determined and included in the information regarding current road characteristics. At step 134, information corresponding to recognizable landmarks along the route is determined. Information corresponding to recognizable landmarks may include highly visible business structures such as the highly visible signs of typical gas stations or elaborate structures such as banks and museums.

According to another embodiment, an additional step 135 of determining personalized features as part of the step 130 of FIG. 1 may be included. Personalized features may include user-defined features or common navigation points from previously generated routes that the user is likely to have remembered. The personalized features may be stored in a remote database or may comprise a portion of the user's meta-data.

Available annotations according to steps 131-135 are then appended to a list of available annotations and are ranked at step 140 of FIG. 1, whereupon the remainder of the embodiment is executed in accordance with the foregoing description.

Figure 3:
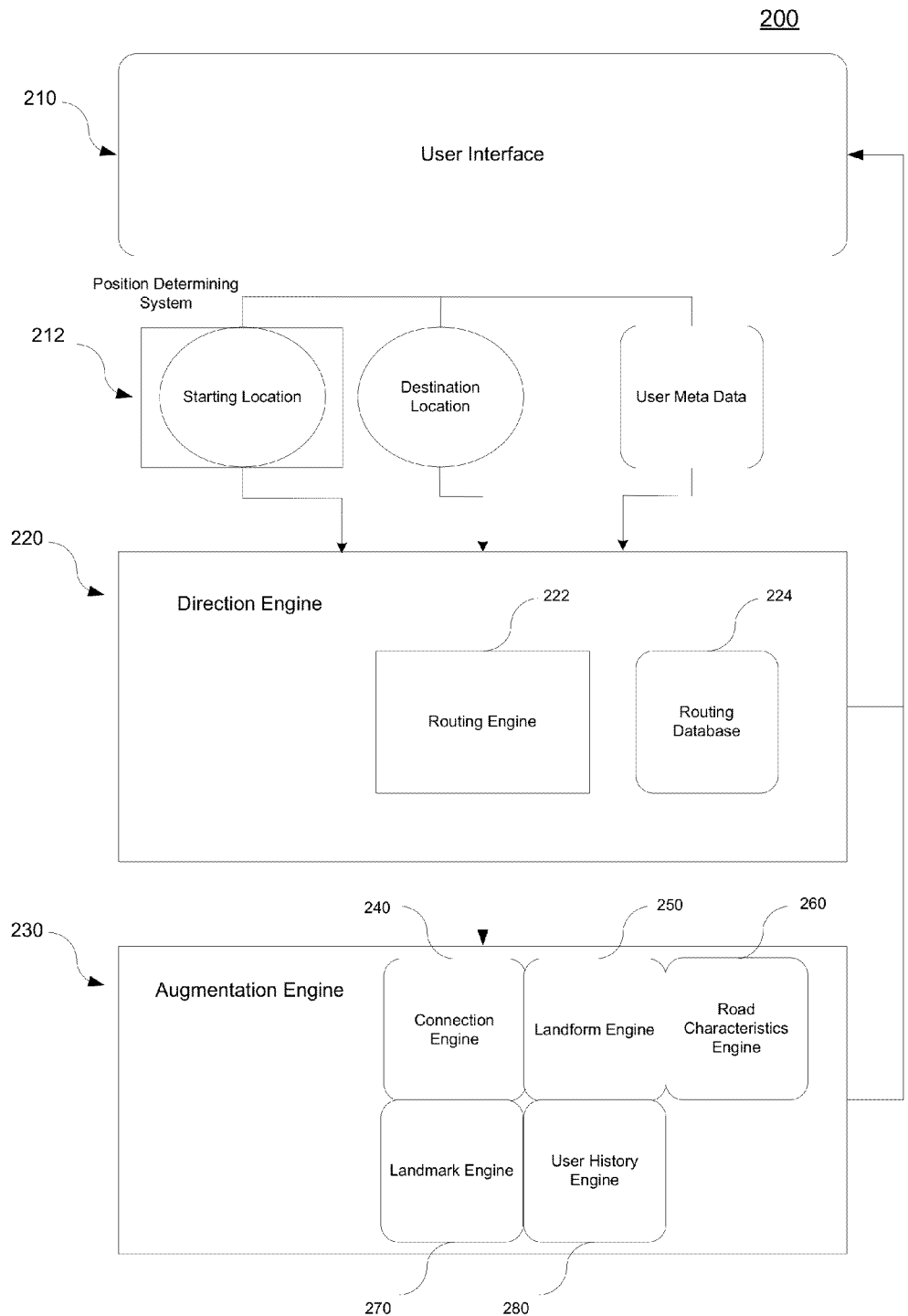
FIG. 3 is a flow diagram describing a system for generating travel directions in accordance with various embodiments.

FIG. 3 is a flow diagram of a system 200 for generating travel directions. The system 200 implements components comprising a User Interface 210, a Direction Engine 220 and an Augmentation Engine 230 to provide certain functionality of the system 200. In one embodiment, the components 210, 220 and 230 are software-based components executing on a computer system platform (e.g., computer system 800 of FIG. 8).

The User Interface 210 acquires from the user a starting location, at least one destination location and meta-data about the specific user, each of which the User Interface 210 submits to the Direction Engine 220. The Direction Engine 220 includes a Routing Engine 222 for generating the route between the starting location and the destination location(s). According to one embodiment, the Routing Engine 222 generates the most efficient route as a sequence of discrete maneuvers according to pre-determined metrics. According to another embodiment, the Direction Engine 220 may include a Routing Database 224 which the Routing Engine 222 references to determine the most efficient route. The route generated by the Direction Engine 220 is submitted along with the obtained meta-data associated with the user to the Augmentation Engine 230. Available annotations associated with the route or specific portions of the route are then determined by components of the Augmentation Engine 230.

The Connection Engine 240 determines available information corresponding to the intersection of roads or pathways along the route. The information corresponding to the intersection of roads or pathways along the route may include information such as the names of the intersecting streets along the generated route immediately prior to or immediately subsequent to an action point of a maneuver. The Landform Engine 250 determines available information corresponding to distinctive landform features along the route. Distinctive landform features include highly visible, natural (e.g., bodies of water, geological structures) or unnatural (e.g., man-made bridges, dams) features along the route.

The Road Characteristics Engine 260 determines available information regarding current road characteristics along the route. Current road characteristics may include traffic conditions, road surfaces, and unusual or difficult maneuvers, etc. The Landmark Engine 270 determines available information regarding recognizable landmarks along the route. Recognizable landmarks including structures such as visibly elaborate buildings or distinctive monuments may comprise the obtained information. The User History Engine 280 determines available information regarding personalized features along the route. Personalized features such as common points of travel along previously generated routes or other user-specified features may comprise the obtained information.

The corresponding information determined by the Connection Engine 240, the Landform Engine 250, the Road Characteristics Engine 260, the Landmark Engine 270 and the User History Engine 280 is appended to a list of available annotations for each corresponding portion of the generated route. The aggregated list of available annotations to the route is then ranked according to a determined priority and used to augment the route generated by the Direction Engine 220 before displaying the resulting output at the User Interface 210. According to one embodiment of the present invention, the aggregated list of available annotations to the route is also filtered at a threshold level of priority before the generated route is augmented.

According to another embodiment, the system 200 may also communicate with a position determining system. According to one embodiment, the position determining system 212 is GPS. Instead of a starting location submitted by the user through the User Interface 210, a position determining system client that travels with the user communicates with the position determining system 212 to determine the location and position of the position determining system client in real-time, which the position determining system 212 then provides to the system 200. The system 200 then generates an augmented route with the current position as determined by the position determining system 212 as the starting location and one or more destination locations as submitted through the User Interface 210. The resulting locations and accompanying meta-data associated with the user are then used to generate the augmented route according to the process described above.

Figure 4:
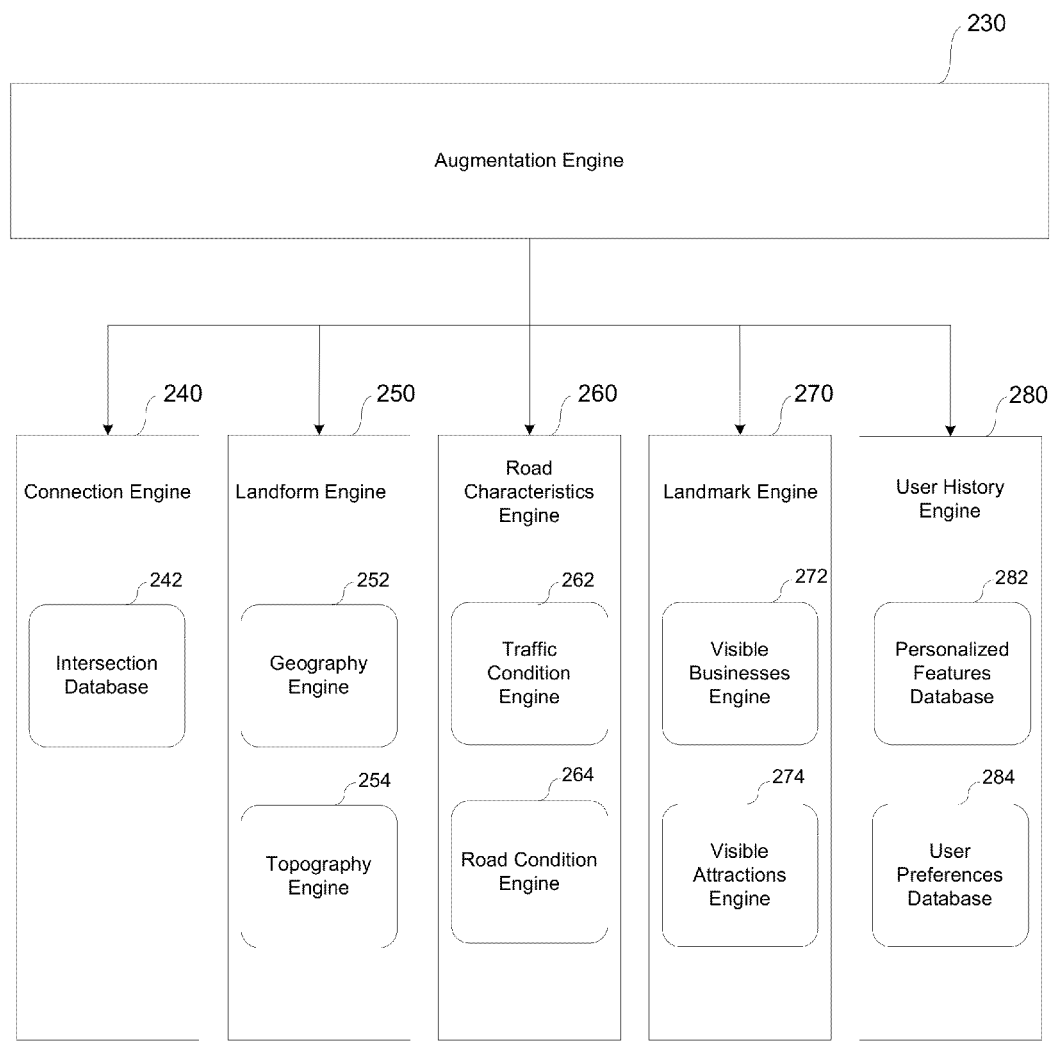
FIG. 4 is a flow diagram of an overview of the various sub-components which may comprise a system in accordance with various embodiments.

FIG. 4 is a flow diagram of an overview of the various sub-components which may comprise various embodiments. In one embodiment, the engines 240, 250, 260, 270 and 280 are software-based components executing on a computer system platform (e.g., computer system 800 of FIG. 8).

The Augmentation Engine 230 derives available annotations for a specified route or portion of a route by determining information corresponding to the specified route. The Augmentation Engine 230 is coupled to a Connection Engine 240 for determining information regarding the intersections of streets along the specified route. The Connection Engine 240 includes an Intersection Database 242 which stores information regarding the intersections of streets for a given area. The Augmentation Engine 230 is further coupled to a Landform Engine 250 for determining noticeable landmarks along the specified route. The Landform Engine 250 may comprise a Geography Engine 252 for determining geographical landmarks and a Topography Engine 254 for determining distinctive topographical fluctuations.

The Augmentation Engine 230 is further coupled to a Road Characteristics Engine 260 for determining the characteristics of the road along the specified route. The Road Characteristics Engine 260 may comprise a Traffic Condition Engine 262 for determining the current traffic conditions at the time of a query and a Road Condition Engine 264 for determining distinctive road surfaces, lane changes, abrupt merges and the like. The Augmentation Engine 230 is also coupled to a Landmark Engine 270 for determining recognizable landmarks along the specified route. The Landmark Engine 270 may comprise a Visible Business Engine 272 for determining visible, highly recognizable common business structures and a Visible Attractions Engine 274 for determining recognizable landmarks and monuments. The Augmentation Engine 230 is also coupled to a User History Engine 280 for determining personalized features along the specified route. The User History Engine 280 may comprise a Personalized Features Database 282 for determining features personalized for the specific user based on common navigation points from previous route queries and a User Preferences Database 284 which stores the specific user's preferences from previous route queries.

The Augmentation Engine 230 is supplied with a generated route apportioned into discrete maneuvers. Each discrete maneuver and its accompanying action point(s) are then cross referenced with the information corresponding to the particular maneuver obtained by the Connection Engine 240, the Landform Engine 250, the Road Characteristics Engine 260, and the Landmark Engine 270—and, according to one embodiment, the User History Engine 280—to derive a list of available annotations for each maneuver.

Figure 5A:
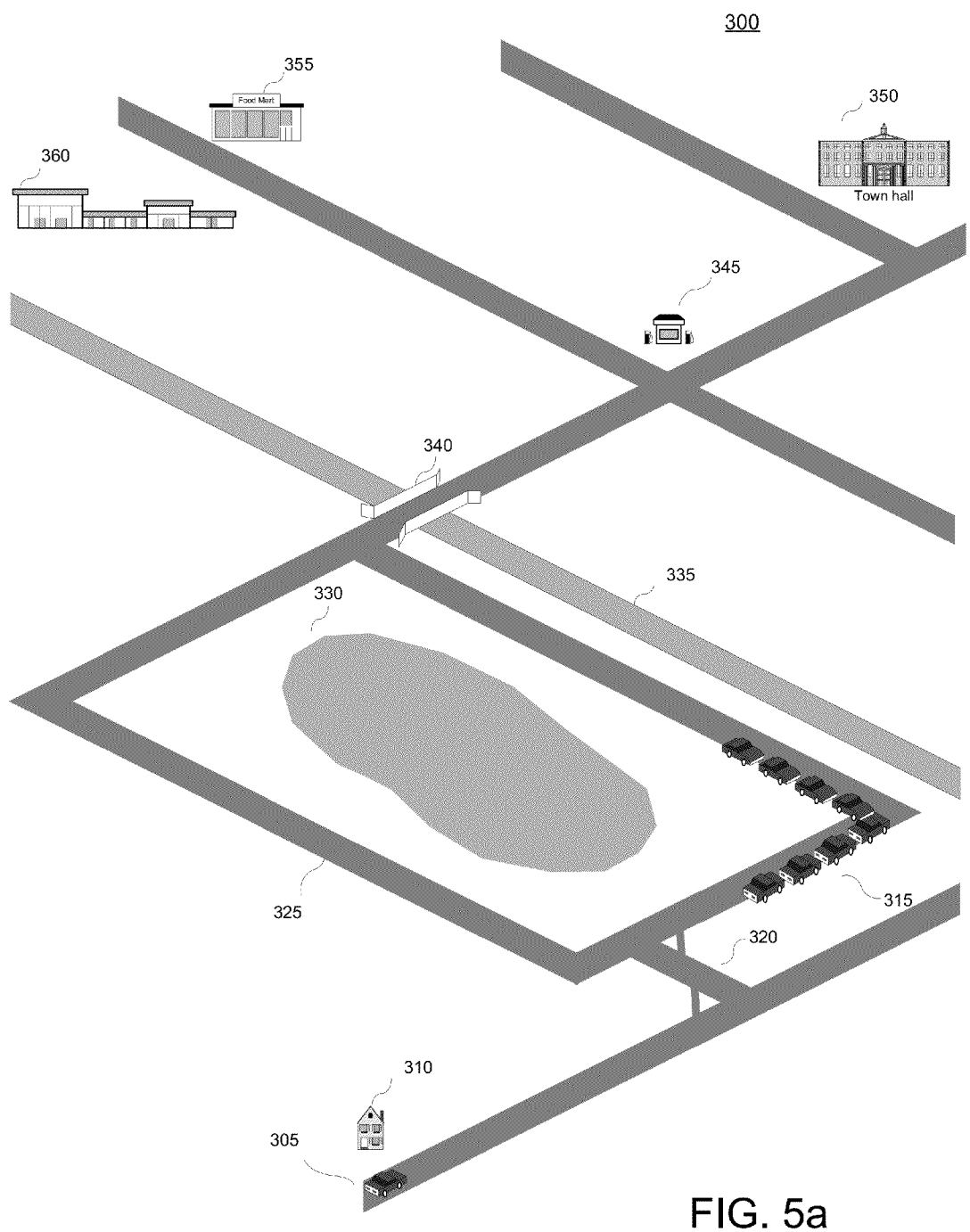
FIG. 5*a* is a graphical representation of a fictional area upon which exemplary annotations that may be used to augment a route generated between two locations may be derived in accordance with various embodiments.

FIG. 5a is a graphical representation of a fictional area upon which exemplary annotations that may be used to augment a route generated between two locations may be derived in accordance with various embodiments.

With reference to FIG. 5a, as an illustrative example, a user of the system submits a query for travel directions in an area 300 between the address 310 to the destination location 360. One embodiment includes functionality to communicate with a position determining system to submit a query for travel directions from the current location of a position determining system client which travels with the user (such as a GPS receiver within a car at 305) directly to the destination address, in lieu of a user-submitted address. Various exemplary annotations between the two locations may include intersection information, landform characteristics, road characteristics, recognizable landmarks and personalized features. An example of intersection information may include a warning of the intersection between a street and a highway at 320. Landform characteristics may include information regarding the relative position of the Lake 330 and the River 335 with respect to the generated route. Road characteristics may include information regarding the automobile collision and subsequent traffic at 315, and a multiple lane changes required at 320. Recognizable landmarks may include the bridge 340, Town hall 350 and the Re-fueling station 345. Personalized features may include the Food Mart 355 if, for example, the user had previously defined the Food Mart 355 in a prior route query, or if the Food Mart 355 was a previous destination or a common navigation point used as a reference.

Figure 5B:
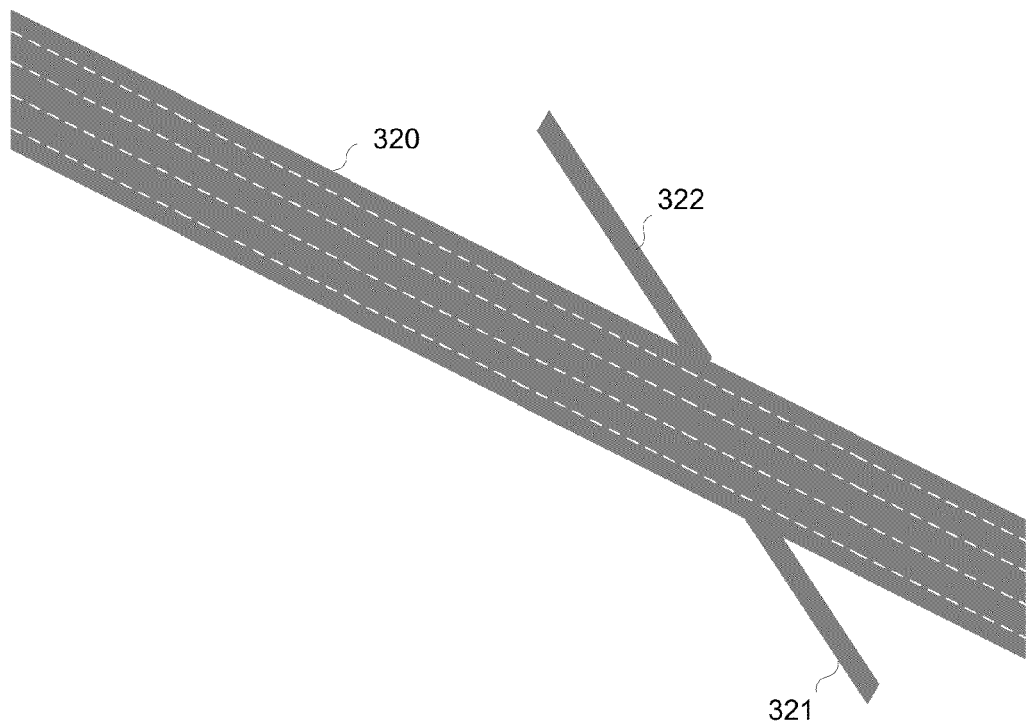
FIG. 5*b* is a graphical representation of an area illustrating a particular annotation that may be used to augment a route generated between two locations in accordance with various embodiments.

FIG. 5b is a graphical representation of an area illustrating a particular annotation that may be used to augment a route generated between two locations in accordance with various embodiments. FIG. 5b provides, with greater detail, an illustrative example of a particular road characteristic that may be used as an annotation.

If a generated route includes travel along a highway 320 whereby the route includes entering the highway 320 from an on-ramp 321 and exiting the highway from an off-ramp 322 in a different lane from which the highway 320 is entered by the on-ramp 321, an annotation may be derived to warn the user of the required multi-lane merges.

Figure 6:
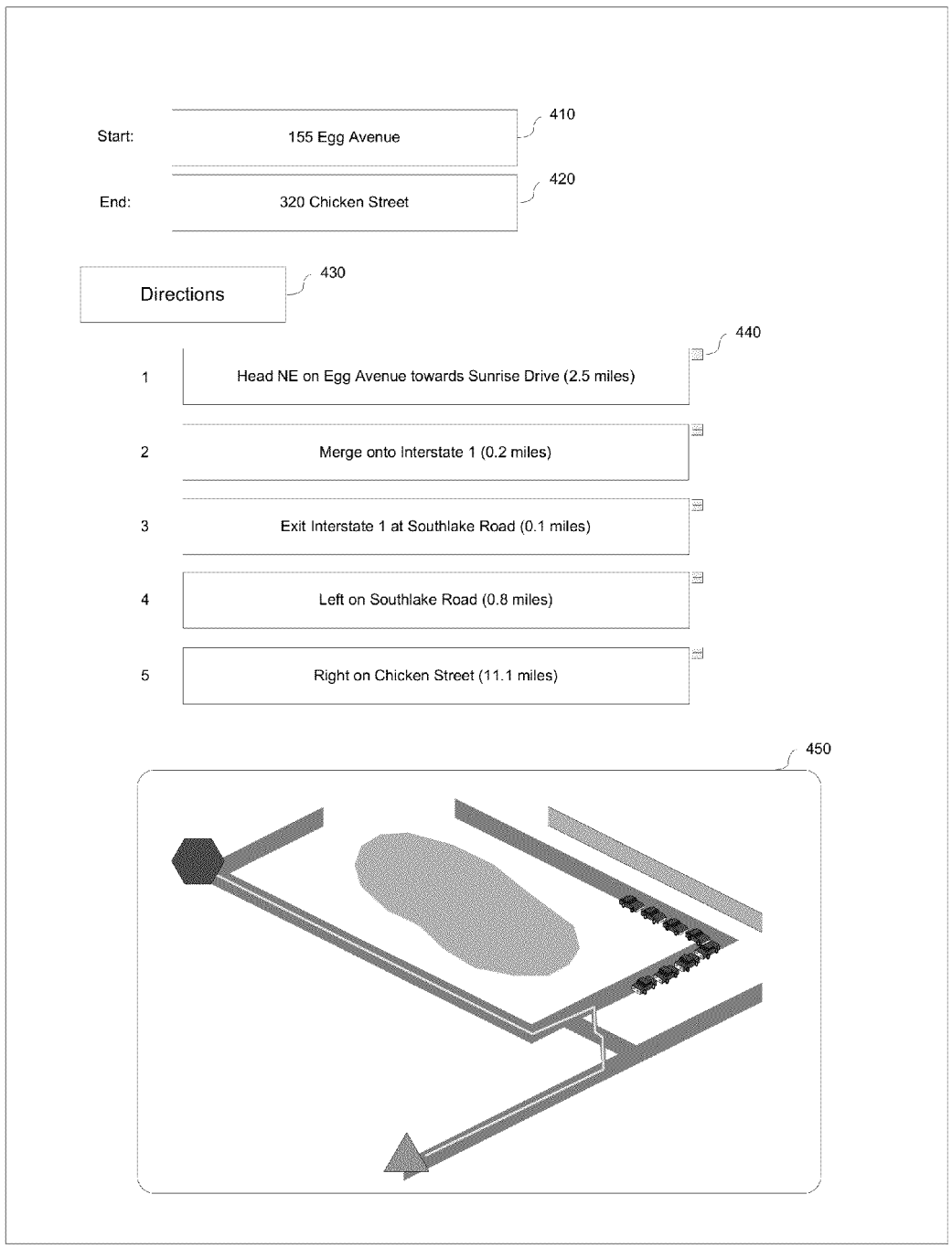
FIG. 6 is an example of possible output displaying an un-augmented route in accordance with various embodiments.

FIG. 6 is an example of possible output displaying an un-augmented route in accordance with various embodiments. A route, with reference to the illustrated area 300 of FIG. 5a, is generated from the starting position 305 to the position 325. The output according to FIG. 6 includes a Start Address 410 and a Destination Address 420 along with a set of instructions 430 to be executed sequentially. Each instruction (enumerated 1, 2, 3, 4, and 5, respectively) is coupled to an option 440 to expand or contract the pre-selected annotations available to augment the route instructions. For illustrative purposes, a "−" sign indicates a contracted instruction, whereas a "+" sign indicates an expanded instruction.

The un-augmented route of output 400 may be outputted by the present invention if for example, the meta-data of the user suggests that the user has a high level of familiarity with the area or large portions of the route, if the system does not determine any available annotations to the generated route, if the user affirmatively elects to contract the annotations (thereby removing them from the display) or if the user's stored preferences determines the user would most likely prefer not to view the annotations. According to one embodiment, the output may also include an illustrated map 450 of the route and the region comprising the route.

Figure 7:
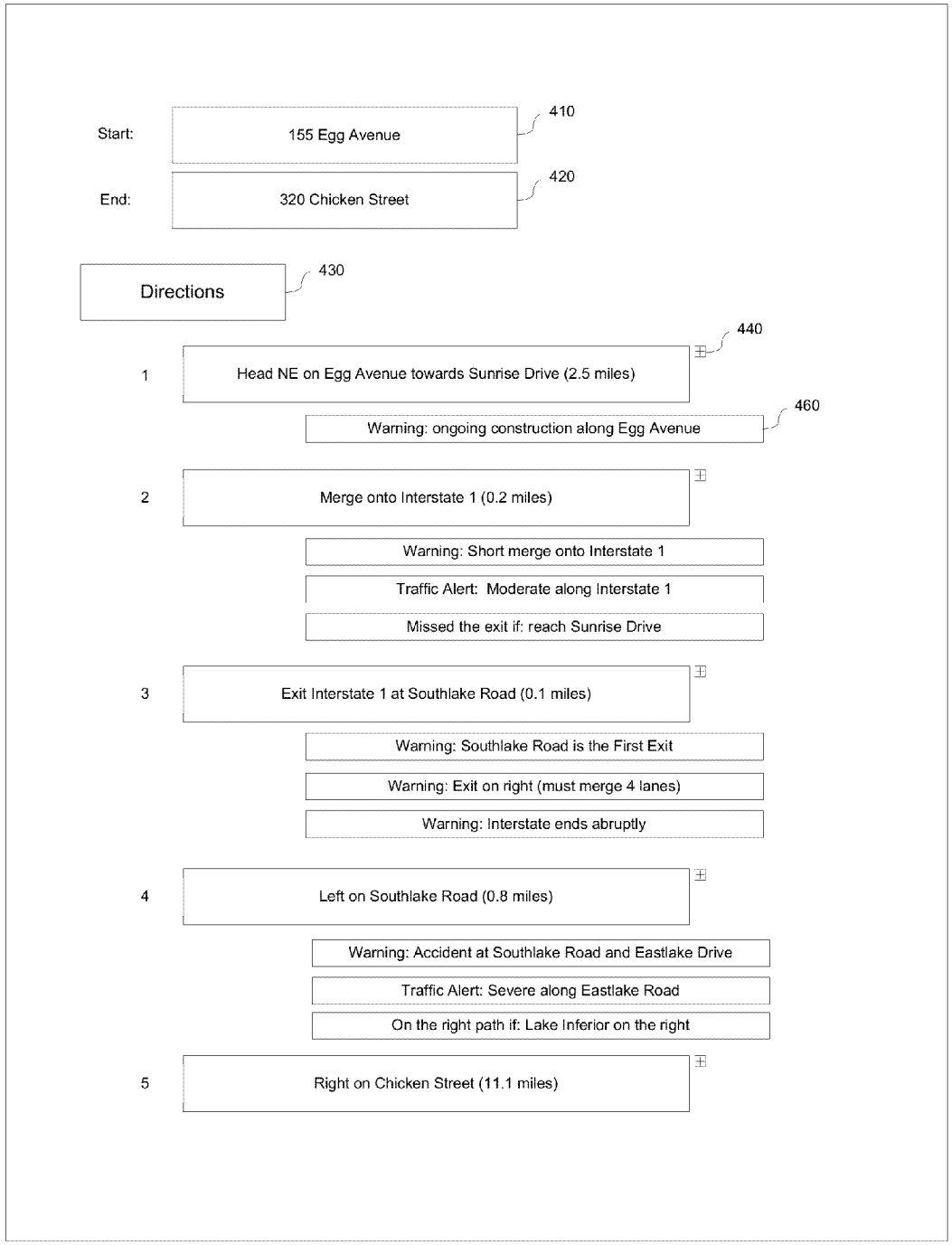
FIG. 7 is an example of possible output displaying an augmented route in accordance with various embodiments.

FIG. 7 is an example of possible output displaying an augmented route in accordance with various embodiments. With reference to the illustrated area 300 of FIG. 5a, the sample output of FIG. 7 depicts an augmented route from starting location 305 to the destination location 325.

The output 500 includes a Start Address 410, a Destination Address 420, and a set of instructions 430 to be executed sequentially. Each instruction (enumerated 1, 2, 3, 4, and 5, respectively) is coupled to an option 440 to expand or contract the pre-selected annotations available to augment the route instructions. As defined in the description for FIG. 6, the "+" sign accompanying each instruction indicates the instruction has been expanded to show annotations. An instruction may include one or more annotations 460, depending on the availability of annotations and the meta-data associated with the specific user.

Figure 8:
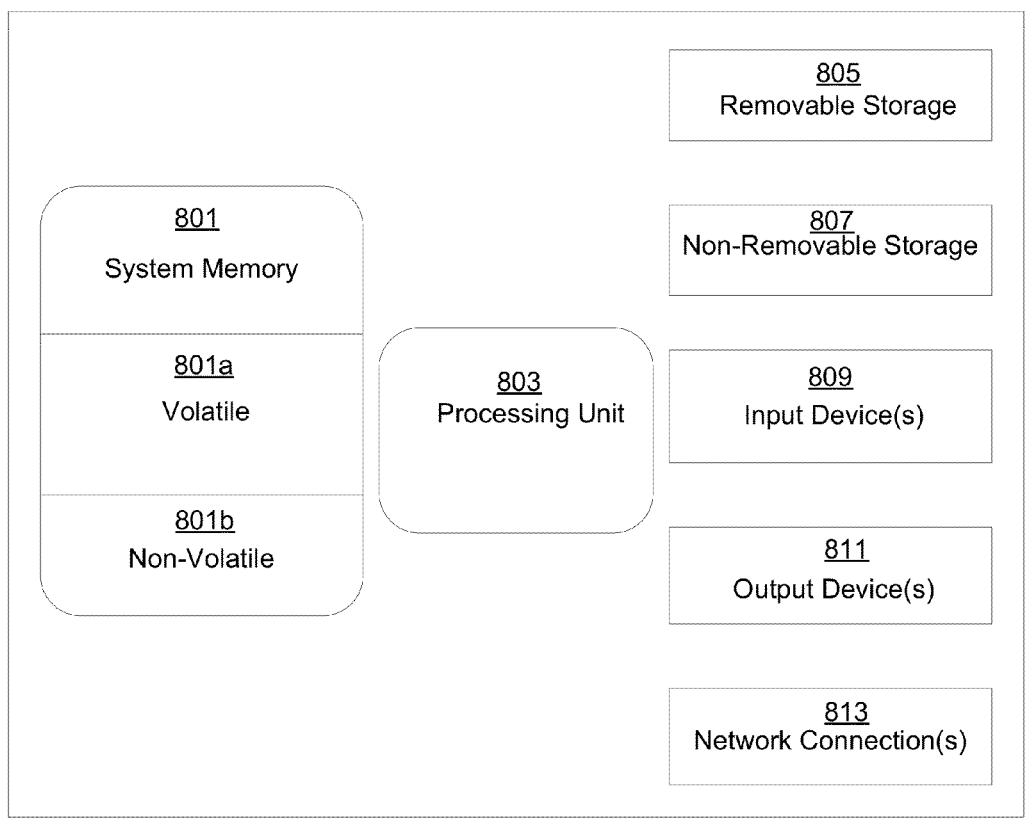
FIG. 8 shows an exemplary computing device in accordance with various embodiments.

FIG. 8 shows an exemplary computing device 800 according to various embodiments. Computing device 800 depicts the components of a basic computer system providing the execution platform for certain hardware-based and software-based functionality in accordance with various embodiments. Computing device 800 can be an environment upon which the components 210, 220 and 230 of the system 200 from FIG. 3 are instantiated. Computing device 800 can also be an environment upon which the components 240, 250, 260, 270 and 280 and their respective subcomponents from FIG. 4 are instantiated. Computing device 800 can be implemented as, for example, a desktop computer system, laptop computer system or server computer system. Similarly, computing device 800 can be implemented as a handheld device (e.g., cellphone, etc.) Computing device 800 typically includes at least some form of computer readable media. Computer readable media can be a number of different types of available media that can be accessed by computing device 800 and can include, but is not limited to, computer storage media.

In its most basic configuration, computing device 800 typically includes processing unit 801 and memory 803. Depending on the exact configuration and type of computing device 800 that is used, memory 803 can be volatile (such as RAM) 803a, non-volatile 803b (such as ROM, flash memory, etc.) or some combination of the two.

Additionally, computing device 800 can include mass storage systems (removable 805 and/or non-removable 807) such as magnetic or optical disks or tape. Similarly, computing device 800 can include input devices 809 and/or output devices 811 (e.g., such as a display). Additionally, computing device 800 can include network connections 813 to other devices, computers, networks, servers, etc. using either wired or wireless media. As all of these devices are well known in the art, they need not be discussed in detail.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing travel directions, comprising:
   receiving, at least in part via a processing unit, a query of direction from a user, the query comprising at least one of a starting location, a destination location, or meta-data associated with the user;
   generating, at least in part via the processing unit, a route between the starting location and the destination location based at least in part on reducing a number of discrete maneuvers associated with the route;
   deriving, at least in part via the processing unit, one or more route related available annotations along the route; and
   ranking, at least in part via the processing unit, at least some of the one or more route related available annotations based at least in part on a determined priority.

2. The method of claim 1, deriving one or more route related available annotations along the route comprising:
   determining intersection information along the route;
   determining landform characteristics along the route;
   determining current road characteristics along the route, at least one of the road characteristics comprising at least one of a traffic condition, a construction delay, or a difficult maneuverability operation; or
   determining recognizable landmarks along the route.

3. The method of claim 2, determining recognizable landmarks comprising determining at least one of:
   one or more recognizable business structures along the route, or
   at least one visible indicia along the route.

4. The method of claim 1, ranking at least some of the one or more route related available annotations comprising determining a priority corresponding to one or more characteristics of the route.

5. The method of claim 1, ranking at least some of the one or more route related available annotations comprising filtering zero or more of the one or more route related available annotations to remove route related available annotations below a threshold level of priority.

6. The method of claim 5, the threshold level of priority based at least in part on the meta-data associated with the user.

7. The method of claim 5, the threshold level of priority based at least in part on a user input.

8. The method of claim 5, comprising augmenting the route with at least one of the one or more ranked route related available annotations above the threshold level of priority.

9. The method of claim 1, comprising using a position determined by a position determining system as the starting location.

10. The method of claim 1, deriving one or more route related available annotations along the route comprising deriving at least one of the one or more route related available annotations based at least in part on at least one of the discrete maneuvers.

11. A computer-readable storage medium comprising hardware storing computer-executable instructions for causing a computer to perform a method for providing travel directions, comprising:
   receiving a query of direction from a user, the query comprising at least one of a starting location, a destination location, or meta-data associated with the user;
   generating a route between the starting location and the destination location based at least in part on reducing a number of discrete maneuvers associated with the route;
   deriving one or more route related available annotations along the route; and
   ranking at least some of the one or more route related available annotations based at least in part on a determined priority.

12. The computer-readable storage medium of claim 11, the meta-data associated with the user comprising one or more user-specified preferences.

13. The computer-readable storage medium of claim 11, ranking at least some of the one or more route related available annotations comprising cross-referencing one or more user-specified preferences.

14. The computer-readable storage medium of claim 11, the meta-data associated with the user comprising one or more user-specific features.

15. The computer-readable storage medium of claim 11, comprising presenting the route based at least in part on the determined priority.

16. A system for automatically generating travel directions, comprising:
   a direction engine configured to generate a route between a starting location and a destination location entered by at least one of a user or a positioning system, the direction engine configured to generate the route based at least in part on reducing a number of maneuvers associated with the route; and an augmentation engine configured to derive one or more route related available annotations to add to the route, at least some of at least one of the direction engine or the augmentation engine implemented at least in part via a processing unit.

17. The system of claim 16, comprising an interactive user interface configured to at least one of receive user input or display the route with at least one of the one or more route related available annotations.

18. The system of claim 16, comprising a filtering component configured to filter zero or more of the one or more route related available annotations.

19. The system of claim 16, the positioning system comprising a Global Positioning System.

20. The system of claim 16, at least one of the one or more route related available annotations comprising information associated with visible indicia corresponding to one or more maneuvers along the route.

* * * * *